(12) United States Patent
Choi (10) Patent No.: US 12,001,924 B2
(45) Date of Patent: Jun. 4, 2024

(54) CONSTRUCTING AND PROGRAMMING DRIVER GRAPHS IN QUANTUM HARDWARE FOR NON-STOQUASTIC QUANTUM OPTIMIZATION ANNEALING PROCESSES

(71) Applicant: GLADIOLUS VERITATIS CONSULTING COMPANY, Vancouver (CA)

(72) Inventor: Vicky Choi, Mission (CA)

(73) Assignee: GLADIOLUS VERITATIS CONSULTING COMPANY

( * ) Notice: Subject to any disclaimer, the term of this patent is extended or adjusted under 35 U.S.C. 154(b) by 0 days.

(21) Appl. No.: 18/020,014

(22) PCT Filed: Feb. 7, 2022

(86) PCT No.: PCT/CA2022/050172
§ 371 (c)(1),
(2) Date: Feb. 6, 2023

(87) PCT Pub. No.: WO2022/178623
PCT Pub. Date: Sep. 1, 2022

(65) Prior Publication Data
US 2024/0046138 A1 Feb. 8, 2024

Related U.S. Application Data

(60) Provisional application No. 63/178,597, filed on Apr. 23, 2021, provisional application No. 63/153,870, filed on Feb. 25, 2021.

(51) Int. Cl.
*G06N 10/60* (2022.01)
*G06N 10/40* (2022.01)

(52) U.S. Cl.
CPC ............. *G06N 10/60* (2022.01); *G06N 10/40* (2022.01)

(58) Field of Classification Search
None
See application file for complete search history.

(56) References Cited

U.S. PATENT DOCUMENTS 8,229,863 B2 7/2012 Amin et al.
10,255,557 B2 4/2019 Epstein et al.
(Continued)

OTHER PUBLICATIONS

Lamm et al., Exactly Solving the Maximum Weight Independent Set Problem on Large Real-World Graphs, arXiv: 1810.10834v1 [cs. DS] Oct. 25, 2018; Total pp. 18 (Year: 2018).*
(Continued)

*Primary Examiner* — Alan Chen
(74) *Attorney, Agent, or Firm* — MBM Intellectual Property Law LLP (57) ABSTRACT

A computer implemented method includes receiving, by a control system, an optimization problem expressed as a MWIS on a problem graph. Then encoding the MWIS problem into an energy spectrum of a problem Hamiltonian. Also, determining an XX-driver graph based on an identified independent-cliques (IC), where the edges in the XX-driver graph are the edges between partites in each clique of the IC. Also, determining XX-coupler strengths associated with the XX-driver graph, and specifying a non-stoquastic driver Hamiltonian based on the XX-driver graph and the associated XX-coupler strengths. Also, initializing and programming a time-dependent non-stoquastic system Hamiltonian of the quantum annealing hardware using determined values of parameters included in the problem Hamiltonian and determined values of parameters included in the non-stoquastic driver Hamiltonian. Furthermore, implementing, by the hardware, a quantum annealing schedule, and receiving
(Continued)

an output representing eigen-states of the system Hamiltonian and corresponding energy values.

12 Claims, 7 Drawing Sheets

(56) References Cited

U.S. PATENT DOCUMENTS

| | | |
|---|---|---|
| 10,510,015 B2 | 12/2019 | Mohseni et al. |
| 2008/0065573 A1 | 3/2008 | Macready |
| 2016/0094274 A1* | 3/2016 | Sundaresan .......... H04L 41/0893 375/257 |
| 2018/0232654 A1 | 8/2018 | Epstein et al. |
| 2019/0266508 A1 | 8/2019 | Bunyk et al. |
| 2020/0380704 A1* | 12/2020 | Yang ...................... G06T 7/246 |
| 2021/0224680 A1 | 7/2021 | Mohseni et al. |

OTHER PUBLICATIONS

Li et al., An Efficient Local Search for the Maximum Edge Weighted Clique Problem, IEEEAccess; Digital Object Identifier 10.1109/ACCESS.2018.2799953; Mar. 15, 2018; Total pp. 11 (Year: 2018).*

Wayne Pullan, Optimisation of unweighted/weighted maximum independent sets and minimum vertex covers, Discrete Optimization 6 (2009); pp. 214-219; (Year: 2009).*

International Search Report issued on corresponding PCT Application No. PCT/CA2022/050172 dated May 15, 2022.

Written Opinion issued on corresponding PCT Application No. PCT/CA2022/050172 dated May 15, 2022.

* cited by examiner

CONSTRUCTING AND PROGRAMMING DRIVER GRAPHS IN QUANTUM HARDWARE FOR NON-STOQUASTIC QUANTUM OPTIMIZATION ANNEALING PROCESSES

CROSS REFERENCE TO RELATED APPLICATIONS

This application claims the benefit of priority to U.S. Provisional Application Ser. No. 63/153,870 filed Feb. 25, 2021, and U.S. Provisional Application Ser. No. 63/178,597 filed Apr. 23, 2021, the contents of which are hereby incorporated by reference.

FIELD OF THE INVENTION

The present invention pertains to the field of quantum computing, and in particular to constructing and programming driver graphs in quantum hardware for non-stoquastic quantum optimization annealing processes.

BACKGROUND

Adiabatic quantum computation in the quantum annealing form is a quantum computation model proposed for solving the NP-hard combinatorial optimization problems. The main bottleneck of an adiabatic quantum algorithm (AQA) for solving an optimization problem is due to the exponentially small minimum-spectral gap caused by the presence of an anti-crossing (AC) between energy levels corresponding to the local and global minima of the optimization problem. Such a gap would require the quantum annealer (QA), the hardware that implements quantum annealing algorithms, to operate in exponential time in order to solve the problem correctly, otherwise the QA would fail and return something incorrect, possibly a local minima, if the annealing time is only polynomial.

Therefore, there is a need for methods and apparatus for constructing and programming non-stoquastic XX-driver graphs in using quantum hardware of the quantum optimization annealer to solve NP-hard combinatorial optimization problems in polynomial time that obviates or mitigates one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide methods and an apparatus for constructing and programming new non-stoquastic XX-driver graphs in quantum hardware so that some hard instances of an NP-hard combinatorial optimization problem can be successfully solved in polynomial time. These hard instances, which are not known to be solved in polynomial time by classical algorithms, can be characterized by the presence of an anti-crossing (AC) in a stoquastic quantum annealing algorithm. We describe how to design an appropriate XX-driver graph (without knowing the prior problem structure) with appropriate XX-coupler strengths such that the resulting non-stoquastic QA algorithm has the following characteristics:

Two correlated anti-crossings (a double-AC) with a large second-level gap such that the system can be operated diabatically in polynomial time.

A sequence of nested anti-crossings (a double-AC within a double-AC) or a multi-level double-AC with a large separation gap from the higher energy levels such that the system can be operated diabatically in polynomial time.

No anti-crossing such that the system operates adiabatically in polynomial time.

In all these cases, the non-stoquastic QA algorithm runs in polynomial time, and achieves at least polynomial, with the possibly of an exponential speedup (depending on the AC gap size) over the stoquastic counterpart, and state-of-the-art classical algorithms in optimization.

In accordance with embodiments of the present invention, there is provided a computer implemented method including receiving, by a control system, an optimization problem expressed as a Maximum Weighted Independent Set (MWIS) on a problem graph. Then encoding, by the control system, the MWIS problem into an energy spectrum of a problem Hamiltonian. Also, determining, by the control system, an XX-driver graph based on an identified independent-cliques (IC), where the edges in the XX-driver graph are the edges between partites in each clique of the IC. The edges in the XX-driver graph correspond to XX-couplers of a quantum annealing hardware. Also, determining, by the control system, XX-coupler strengths associated with the XX-driver graph, and specifying, by the control system, a non-stoquastic driver Hamiltonian based on the XX-driver graph and the associated XX-coupler strengths. Also, initializing and programming, by the control system, a time-dependent non-stoquastic system Hamiltonian of the quantum annealing hardware using determined values of parameters included in the problem Hamiltonian and determined values of parameters included in the non-stoquastic driver Hamiltonian. Furthermore, implementing, by the programmed quantum annealing hardware, a quantum annealing schedule, and receiving, by the control system and from the quantum annealing hardware, an output representing eigen-states of the system Hamiltonian and corresponding energy values, where the eigenstates and the corresponding energy values include a solution to the optimization problem.

In further embodiments, the system Hamiltonian of the quantum annealing hardware comprises a plurality of qubits, ZZ-couplings between the qubits, and XX-couplings between the qubits.

In further embodiments, the problem Hamiltonian, $\mathcal{H}_p$, is given by $$P(t)\left(\sum_{i \in V(G)} h_i \sigma_i^z + \sum_{ij \in E(G)} J_{ij} \sigma_i^z \sigma_j^z\right)$$

defined on a problem graph, $G=(V(G), E(G))$, wherein each vertex, $i \in V(G)$, of the problem graph corresponds to a qubit, and each edge, $ij \in E(G)$, of the graph corresponds to a ZZ-coupler between two qubits, i and j. $h_i$ and $J_{ij}$ take real value. $P(t)$ represents a time-dependent control parameter, and $\sigma_i^z$ represents Pauli-z operator for qubit i.

In further embodiments, the non-stoquastic driver Hamiltonian, $\mathcal{H}_D$, is given by $$I(t) \sum_{i \in V(G_{driver})} \Delta_i \sigma_i^x + D(t) \sum_{ij \in E(G_{driver})} d_{ij} \sigma_i^x \sigma_j^x$$

defined on a driver graph, $G_{driver}=(V(G_{driver}), E(G_{driver}))$, wherein each vertex, $i \in V(G_{driver})$, corresponds to a qubit, and each edge, $ij \in E(G_{driver})$, corresponds to an XX-coupler between two qubits, i and j, and the coupler strength $d_{ij}$ take real values. I(t), D(t) represent a time-dependent control parameter, and $\sigma_i^x$ represents Pauli-x operator for qubit i.

Embodiments further include initializing the quantum annealing hardware to be in accordance with a ground state of the non-stoquastic driver Hamiltonian, and letting the quantum annealing hardware evolve adiabatically at least the initial portion of the evolution such that the time-dependent system Hamiltonian remains in its instantaneous ground state.

In further embodiments, the quantum annealing hardware, represented by the time-dependent non-stoquastic system Hamiltonian for some non-stoquastic driver Hamiltonian with certain XX-coupling strengths, includes a double anti-crossing (AC), the double anti-crossing being two correlated anti-crossings.

In further embodiments, the quantum annealing hardware, diabatically transitions to its instantaneous first excited state at the first AC, then adiabatically follows its instantaneous first excited state, and finally returns to its instantaneous ground state through the second AC.

In further embodiments, the quantum annealing hardware, represented by the time-dependent non-stoquastic system Hamiltonian for some non-stoquastic driver Hamiltonian with certain XX-coupling strengths, includes at least one nested double anti-crossings (ACs), each nested double-AC being a double-AC within another double-AC.

In further embodiments, the quantum annealing hardware transitions to each of its instantaneous higher excited state successively through a cascade of first ACs, the number of ACs equating the number of k excited states, adiabatically following the instantaneous kth excited state and transitioning back to its instantaneous ground state through a cascade of second ACs.

In further embodiments, the quantum annealing hardware, represented by the time-dependent non-stoquastic system Hamiltonian for some non-stoquastic driver Hamiltonian with certain XX-coupling strengths, includes no anti-crossing (AC).

In further embodiments, the quantum annealing hardware evolves adiabatically and remains in its instantaneous ground state until the quantum annealing hardware reaches the ground state of its final Hamiltonian.

In accordance with embodiments of the present invention, there is provided a method for computing the local minima of a Maximum Weighted Independent Set (MWIS) on a problem graph that is formed by a set of independent cliques (IC) of partites based on a subset, P, of local minima. The method includes identifying, by comparing every pair of local minima in P, to obtain a collection of potential partites, the collection of potential partites forming a partial clique, extending these partial cliques by local search, and eliminating some partites so that the cliques of partites (IC) are independent.

Further embodiments include, including in the IC, edges between the partites of the IC in the problem graph.

In further embodiments, the subset P is determined by an adiabatic stoquastic quantum annealing algorithm, a simulated quantum annealing algorithm, or a classical algorithm.

In accordance with embodiments of the present invention, there is provided a control system for programming quantum annealing hardware. The control system includes one or more computers, each of the one or more computers including a processor and a computer-readable media having instructions stored therein which, when executed by the processors, cause the one or more computers to perform any of the methods disclosed herein.

Embodiments have been described above in conjunctions with aspects of the present invention upon which they can be implemented. Those skilled in the art will appreciate that embodiments may be implemented in conjunction with the aspect with which they are described but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

Embodiments will now be described with reference to the figures. For simplicity and clarity of illustration, where considered appropriate, reference numerals may be repeated among the Figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures, and components have not been described in detail so as not to obscure the embodiments described herein. Also, the description is not to be considered as limiting the scope of the embodiments described herein.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description Embodiments of the present invention provide methods and apparatus for constructing and programming new non-stoquastic XX-driver graphs in quantum hardware so that some hard instances of an NP-hard combinatorial optimization problem can be successfully solved in polynomial time. For these hard instances, which are not known to be solved in polynomial time by classical algorithms and are characterized by the presence of an anti-crossing (AC) in a stoquastic quantum annealing (QA) algorithm, embodiments enable the design of an appropriate XX-driver graph (without knowing the prior problem structure) with appropriate XX-coupler strengths. The resulting non-stoquastic QA algorithm has several characteristics. One characteristic is having two correlated anti-crossings (a double-AC) with a large second-level gap such that the system can be operated diabatically in polynomial time. Another characteristic is having a sequence of nested anti-crossings (a double-AC within a double-AC) or a multi-level double-AC with a large separation gap from the higher energy levels such that the system can be operated diabatically in polynomial time. A further characteristic is having no anti-crossing such that the system operates adiabatically in polynomial time.

In embodiment, the non-stoquastic QA algorithm runs in polynomial time and achieves at least polynomial, with the possibly of an exponential speedup (depending on the AC gap size) over the stoquastic counterpart, and state-of-the-art classical algorithms with optimization.

Adiabatic quantum computation in the quantum annealing form is a quantum computation model proposed for solving the NP-hard combinatorial optimization problems. A quantum annealing algorithm is described by a system Hamiltonian:

$$\mathcal{H}(s)=(1-s)\mathcal{H}_{driver}+s\mathcal{H}_{problem}, \quad (1)$$

where $\mathcal{H}_{driver}$ is a driver Hamiltonian whose ground state is known and easy to prepare, $\mathcal{H}_{problem}$ is a problem Hamiltonian whose ground state encodes the solution to an optimization problem, and $s \in [0,1]$ is a parameter that depends on time. A typical example of a system Hamiltonian is a transverse-field Ising model, $\mathcal{H}^{Tran}$, where the driver Hamiltonian may be expressed as, $\mathcal{H}_X = -\Sigma_{i \in V(G)} \sigma_i^x$, and the problem Hamiltonian, $\mathcal{H}_{problem}$, is an Ising Hamiltonian, $\mathcal{H}_{Ising} = \Sigma_{i \in V(G)} h_i \sigma_i^z + \Sigma_{ij \in E(G)} J_{ij} \sigma_i^z \sigma_j^z$, defined on a problem graph $G=(V(G), E(G))$, which encodes the optimization problem to be solved. A quantum processor or quantum hardware that implements the (many-body) system Hamiltonian is also referred to as a quantum annealer (QA). Initially, the QA is prepared in the known ground state of the driver Hamiltonian. The process of driving the QA from the ground state of $\mathcal{H}_{driver}$ to the ground state of $\mathcal{H}_{problem}$ is called a QA schedule or a quantum annealing process, or a quantum evolution process. The running time of the algorithm, also referred to as the annealing time, and is the total evolution time, $t_f = s^{-1}$ (1). Typically, QA is assumed to be operated adiabatically, and the system remains in its instantaneous ground state throughout the entire evolution process. However, QA can be operated non-adiabatically when the system undergoes diabatic transitions to the excited states and then return to the ground state. The former is referred to as AQA, and the latter as DQA. The run time ($t_f$) of an AQA algorithm is inversely proportional to a low power of the minimum spectral gap (min-gap), between the ground state and the first excited state of the system Hamiltonian, because of the adiabatic theorem. Thus far, the possible quantum speedup of the transverse-field Ising-based QA as a heuristic solver for optimization problem over state-of-the-art classical (heuristic) algorithms has known drawbacks. The min-gap can be exponentially small in the problem size and thus an AQA algorithm can take exponential time, without achieving quantum advantage. Indeed, one can easily construct problem instances that take exponential time because of the exponential small gap due to an anti-crossing (AC) between energy levels corresponding to the local and global minima of the optimization problem.

In embodiments, a driver Hamiltonian, $\mathcal{H}_{driver}$, may include both X-term, $\mathcal{H}_X = -\Sigma_{i \in V(G)} \sigma_i^x$, and XX-term, $\mathcal{H}_{XX} = -\Sigma_{ij \in V(G_{driver})} d_{ij} \sigma_i^x \sigma_j^x$, where $G_{driver}$ is the driver graph, and $d_{ij}$ can be positive or negative real numbers. For simplicity, it can be assumed that $d_{ij} \equiv J_{xx}$ for all $ij \in E(G_{driver})$, where $J_{xx}$ is referred to as an XX—coupler strength.

In particular, embodiments include the following two types of driver Hamiltonians:

$$\mathcal{H}_{driver} = \begin{cases} \mathcal{H}_X & (DX) \\ \mathcal{H}_X + s\mathcal{H}_{XX} & (DXX) \end{cases}$$

Type (DX) is a standard transverse field driver Hamiltonian with the uniform superposition state as the (initial) ground state. The type (DXX) driver Hamiltonian may be referred to as a "catalyst" or as an XX-driver (which includes both the X-term and XX-term), whose initial ground state (where s=0) is the same as the type DX's. Embodiments may include both the stoquastic XX-driver (where $J_{XX}<0$) and the non-stoquastic XX-driver (where $J_{XX}>0$). A Hamiltonian is called stoquastic if its non-zero off-diagonal matrix elements in the computational basis are all negative; otherwise, it is called non-stoquastic.

In embodiments, non-adiabatic (diabatic) quantum annealing (DQA) may be used to solve the optimization problem, where the system returns to the ground state at the end of the evolution. Therefore, the DQA of embodiments may be referred to as DQA-GS to distinguish from other DQAs known in the art.

Embodiments may use an NP-hard maximum-weighted independent set (MWIS) as a model problem and may make use of the MWIS problem structure to construct the driver graph. MWIS and Ising problems can be efficiently reduced to each other. The MIS-Ising Hamiltonian is specified by a problem graph G and a weight vector w on its vertices and $J_{penalty}$ for the edge penalty. Embodiments denote the system Hamiltonian in Eq. (1) for solving the WMIS problem on the weighted G by $\mathcal{H}^{Tran}(G)$ when $\mathcal{H}_{driver}=\mathcal{H}_X$; and by $\mathcal{H}^{XX-Sys}(J_{XX},G_{driver},G)$ when $\mathcal{H}_{driver}=\mathcal{H}_X+s\mathcal{H}_{XX}=\mathcal{H}_X+s(J_{XX}\Sigma_{ij\in(G_{driver})}\sigma_i^x\sigma_j^x)$ without explicitly stating $\{h_i, J_{ij}\}$ in the MIS-Ising function that are computed according to the weight function w on G.

Embodiments include designing an appropriate XX-driver graph such that for instances (which are characterized by the presence of an AC in the stoquastic QA algorithm that is described by $\mathcal{H}^{Tran}(G)$), the corresponding non-stoquastic Hamiltonian system that is described by $\mathcal{H}^{XX-Sys}(J_{XX},G_{driver},G)$ has a double-AC or a sequence of nested double-ACs, or a double multi-level anti-crossing, with the desired property, such that one can apply DQA-GS successfully to solve the optimization problem in polynomial time.

Embodiments include an algorithm referred to as DIC-DAC-DOA, which stands for: Driver graph from Independent-Cliques; Double Anti-Crossing; Diabatic quantum Optimization Annealing. A high-level description of DIC-DAC-DOA is described in FIG. 1. The input to the algorithm is a vertex-weighted graph 102, G, of the maximum weighted independent set (MWIS) problem with the assumption that it has a special independent-cliques (IC) structure, where each clique is a clique of partites, with each partite consisting of either one single vertex or an independent set. When all partites are single vertices, the clique of partites is the normal clique; otherwise, the clique is also known as a multi-partite graph, where the partites are the independent sets. The multi-partite graph is not necessarily complete, i.e., not all possible edges between any two partites are present. Such an instance may be referred to as a Graph of IC (GIC) instance. The algorithm consists of two main phases. Phase 1 106 discovers the IC (if presented) in the graph. The information of the IC is used to construct the XX-driver graph. Phase 2 112 runs a DOA polynomial number of times, each time in polynomial annealing time with different coupler strengths. The output is the best solution found, which would be the MWIS of G.

MWIS GIC instances can pose an obstacle to classical algorithmic-solvers or stoquastic AQA because of the IC structure which generates a large set (e.g., exponentially many) of near cost maximal independent sets (corresponding to local minima of the optimization function). The local minima are formed from one element (either one vertex or one partite) from each clique. For example, if there are k cliques in the IC, each of size t, there will be $t^k$ local minima. Such a set of local minima L would cause a formation of an anti-crossing in a stoquastic quantum annealing algorithm, e.g., described by $\mathcal{H}^{tran}$. If all the edges (between any two partites) in the cliques are taken as the XX-couplers in the driver graph $G_{driver}$, and if the XX-coupler strength $J_{XX}$ is positive and large enough, in $\mathcal{H}^{XX-Sys}(J_{XX},G_{driver},G)$, it will force L to split into two opposite subsets, namely L+ (states with positive amplitudes) and L− (state with negative amplitudes), if L is to occupy the instantaneous ground state (while its energy is minimized). This results in two anti-crossings bridged by {L+, L−}, called a double-AC during the evolution process of $\mathcal{H}^{XX-Sys}(J_{XX},G_{driver},G)$. That is, if $G_{driver}=G_L$, the induced subgraph with vertices from L, there is an appropriate XX-coupling strength such that the resulting non-stoquastic QA algorithm, $\mathcal{H}^{XX-Sys}(J_{XX},G_{driver},G)$ is proper non-stoquastic with a double-AC. If the second-level gap between the two anti-crossings is large enough, the system can be operated diabatically in polynomial time, i.e., solve the problem through DQA-GS in polynomial time. More specifically, the system diabatically transitions to the first excited state at the first AC; then it adiabatically follows the first excited state and does not transition to the second excited state because of the large second-level gap; finally, the system returns to the ground state through the second AC. This can be generalized to the system that has a sequence of nested double-ACs or a double multi-level anti-crossing where the diabatic transitions go through a cascade of anti-crossings. In this case, the system diabatically transitions to a band of excited states through a cascade of first ACs (of the nested double-ACs), with the condition that the band of eigenstates is well separated from the next excited state (so that the system will not transition further), and return to the ground state through a cascade of second ACs (of the nested double-ACs).

Figure 2:
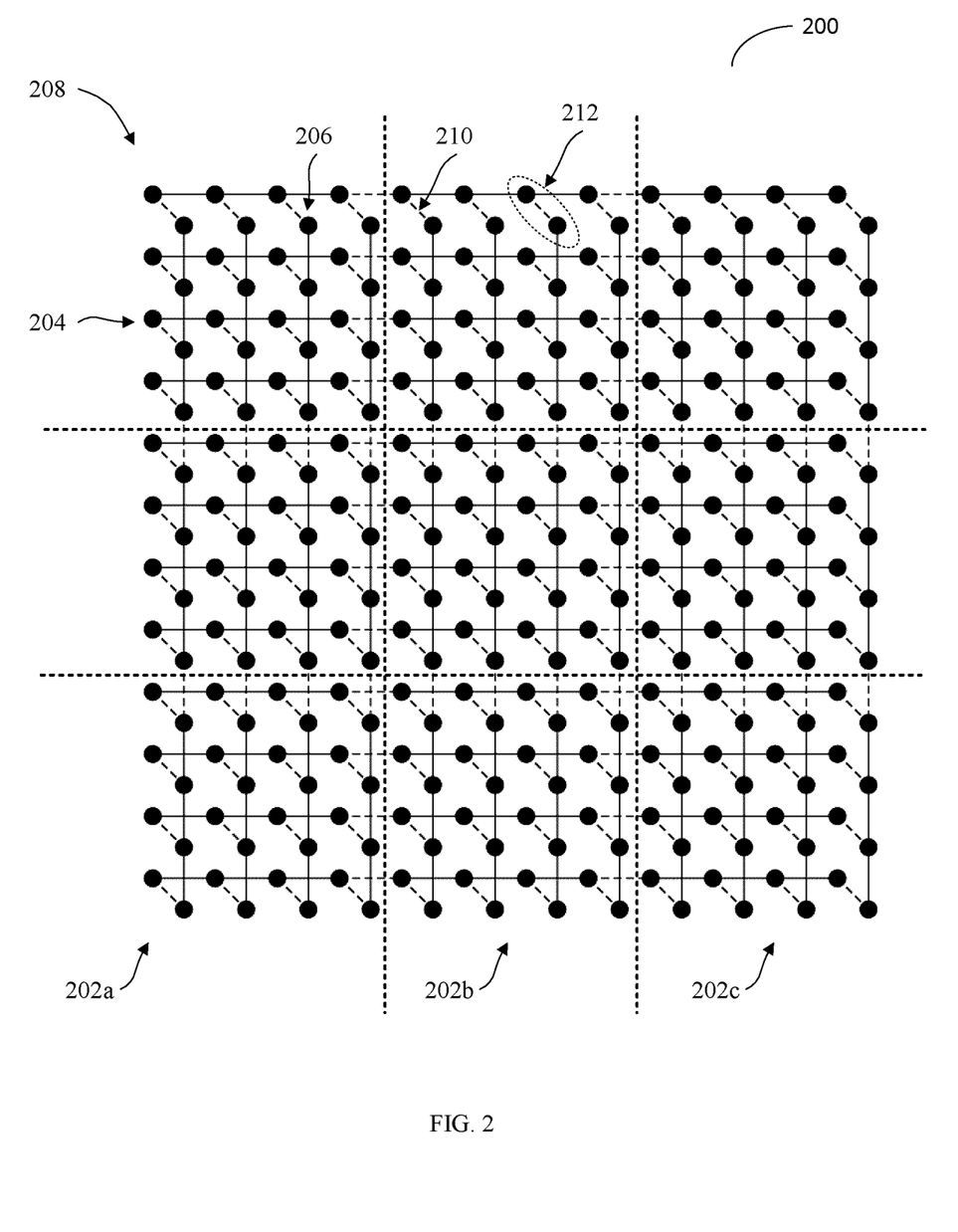
FIG. 2 is a schematic view of interacting qubits in a quantum processor, with both ZZ (for the problem graph) and XX-couplers (for the driver graph), according to an embodiment.

As shown in FIG. 2, in an embodiment, a quantum processor 200 includes, a programmable quantum chip includes 3 by 3 of unit cells (for example 208, 202a, 202b, 202c, etc.) consisting of arrays of qubits. Qubits in a unit cell 208 are organized into groups of four horizontal qubits 204, and four vertical qubits 206. Each horizontal qubit 204 represents by one horizontal line connecting four dots; each vertical qubit 206 represents by one vertical line connecting four dots. Each horizontal qubit 204 is connected to four vertical qubits 206 via programmable inductive couplers 210 as shown by dash lines connecting two dots. Each dot-dash-line-dot group 212 represents one ZZ-coupler and one XX-coupler between the pair of the qubits.

Figure 3:
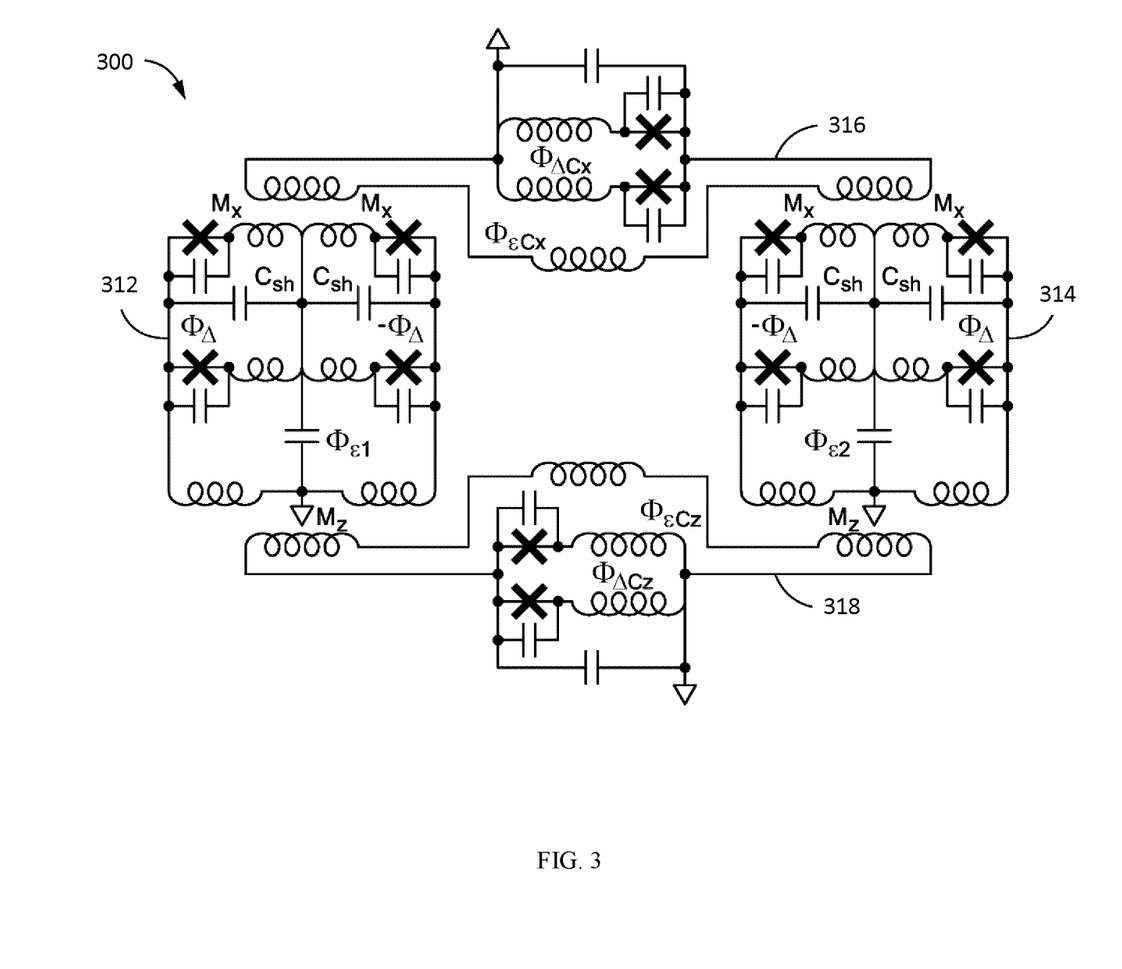
FIG. 3 is a schematic diagram showing the structures and interactions of two qubits in a quantum processor with both ZZ and XX-couplers, according to an embodiment.

FIG. 3 shows an example circuit 300 including a pair of coupled qubits in the same unit cell of a chip that realizes simultaneous and independently controllable ZZ and XX spin coupling between two Josephson phase-slip qubits (JPSQs). It consists of two JPSQs 312 and 314 coupled via two parallel RF SQUID couplers 316 and 318. The coupler 316 is used for the transverse (XX) channel, while the coupler 318 is used for the Ising (ZZ) channel. Note here that the XX channel appears in the common mode flux coupling to the two direct current superconducting quantum interference devices (DC SQUIDs) of each qubit, since the static offsets (DA have opposite sign for the two SQUIDs, reversing the roles of common and differential modes.

In this context, any charge noise appearing on the islands of the two JPSQs 312 and 314 would in this representation appear as fluctuating Y fields. Given that charge noise tends to be relatively larger compared to flux noise in appropriate units, for our circuit this noise advantageously does not appear in first order in either the X or Z channels when any X or Z fields are present, but only in the second order.

In embodiments, the Hamiltonian $\mathcal{H}^{Tran}$ of the QA can be written as:

$$\mathcal{H}^{Tran}=I(t)(-\Sigma_{i\in V(G)}\sigma_i^x)+P(t)[\Sigma_{i\in V(G)}h_i\sigma_i^z+\Sigma_{ij\in E(G)}J_{ij}\sigma_i^z\sigma_j^z]$$

Where $\sigma_i^x$ and $\sigma_i^z$ are Pauli operator and each represents the spin of the $i^{th}$ qubit along the x direction and the z direction, respectively. $h_i$ and $J_{ij}$ are parameters that can be programmed for different problems to be solved by adjusting the coupling provided by the inductive coupler set. $h_i$ and $J_{ij}$ have real values. G is the problem graph embedded in the hardware. The embedding is constrained by the hardware layout, e.g., the layout of the qubits shown in FIG. 2. V(G) is the set of vertices of the graph that are corresponding to the set of logical qubits for computation. E(G) is the set of edges of the graph that corresponding to the set of ZZ-couplers. For unconnected qubits, the corresponding $J_{ij}$ is default to 0. I(t) and P(t) represent the time dependency of initial and problem Hamiltonians, respectively. In a simplified example, I(t) equals (1−s), and P(t) equals s, where s equals $t/t_f$.

In embodiments, the Hamiltonian, $\mathcal{H}^{XX\text{-}Sys}$, of the QA can be written as:

$$\mathcal{H}^{XX\text{-}Sys} = I(t)\,\mathcal{H}_X + D(t)\,\mathcal{H}_{XX} + P(t)\,\mathcal{H}_P$$

where I(t), D(t), and P(t) represent the time-dependency of X-term driver, XX-term driver Hamiltonian, and problem Hamiltonians, respectively. In a simplified example, I(t) equals s(1−s), D(t) equals s(1−s), and P(t) equals s, where s equals $t/t_f$. If D(t)=0, $\mathcal{H}^{XX\text{-}Sys}$ is the same as $\mathcal{H}^{Tran}$. In the system Hamiltonian, the X-term driver Hamiltonian is:

$$\mathcal{H}_X = -\Sigma_{i \in V(G)} \sigma_i^x$$

and the XX-term driver Hamiltonian is $$\mathcal{H}_{XX} = \Sigma_{ij \in E(G_{driver})} d_{ij} \sigma_i^z \sigma_j^z$$

where $G_{driver}$ is a driver graph. In a simplified version, all $d_{ij} = J_{XX}$. The problem Hamiltonian is: $\mathcal{H}$ $$\mathcal{H}_P = \Sigma_{i \in V(G)} h_i \sigma_i^z + \Sigma_{ij \in E(G)} J_{ij} \sigma_i^z \sigma_j^z$$

where G is the MWIS problem graph.

We convert the input Ising Hamiltonian or any optimization problem that is expressed in quadratic unconstrained binary optimization (QUBO) form to an MWIS problem specified by a vertex-weighted graph. We then compute the corresponding MIS-Ising problem Hamiltonian with parameters $\{h_i, J_{ij}\}$ from the graph.

Figure 4:
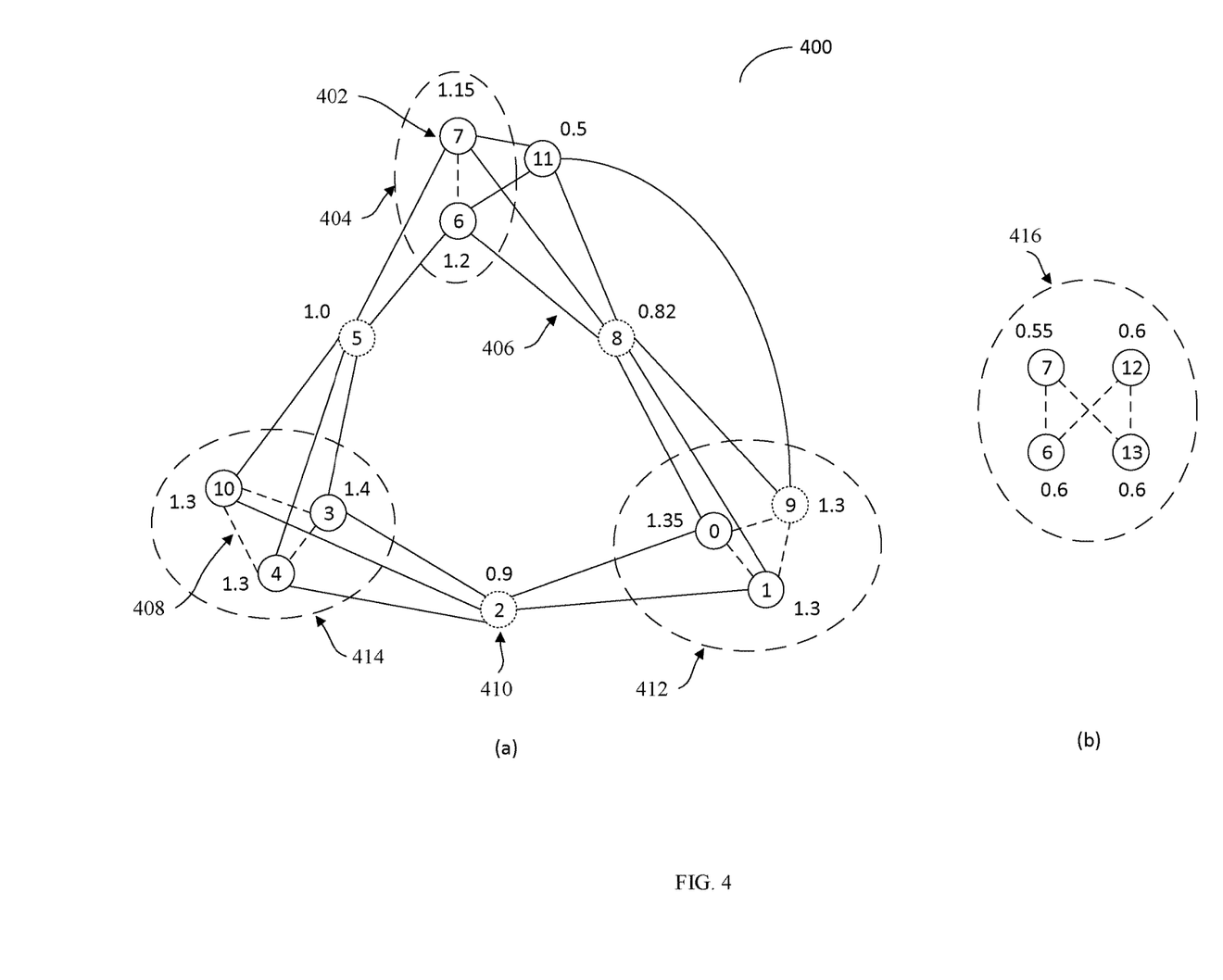
FIG. 4 illustrates an Maximum Weighted Independent Set (MWIS) problem graph and a driver graph, according to an embodiment.

With reference to FIG. 4, an embodiment illustrates an MWIS graph G 400 with 12 vertices (for example vertex 402). The MWIS graph G 400 may also indicate the weight of vertices, for example vertex 402 has a weight of 1.15. The MWIS graph G 400 also includes edges indicated by solid or dashed lines such as 406 and 408). The global minimum is {2, 5, 8, 9} (dotted circles such as 410). There are three independent-cliques that form the local minima, L={{v₁, v₂, v₃}: v₁∈{0,1,9}, v₂∈{3, 4,10}, v₃∈{6, 7}}. In FIG. 4, the clique of {0,1,9} is denoted by reference 412, the clique of {3, 4,10} is denoted by reference 414, and the clique {6, 7} is denoted by reference 404. The edges in G|$_L$, such as edge 408, are denoted by dashed lines. The 2-edge clique {6, 7} can be replaced by a bipartite graph with two partites: {6, 13} and {7, 12} 416. The driver graph is G|$_L$.

Figure 1:
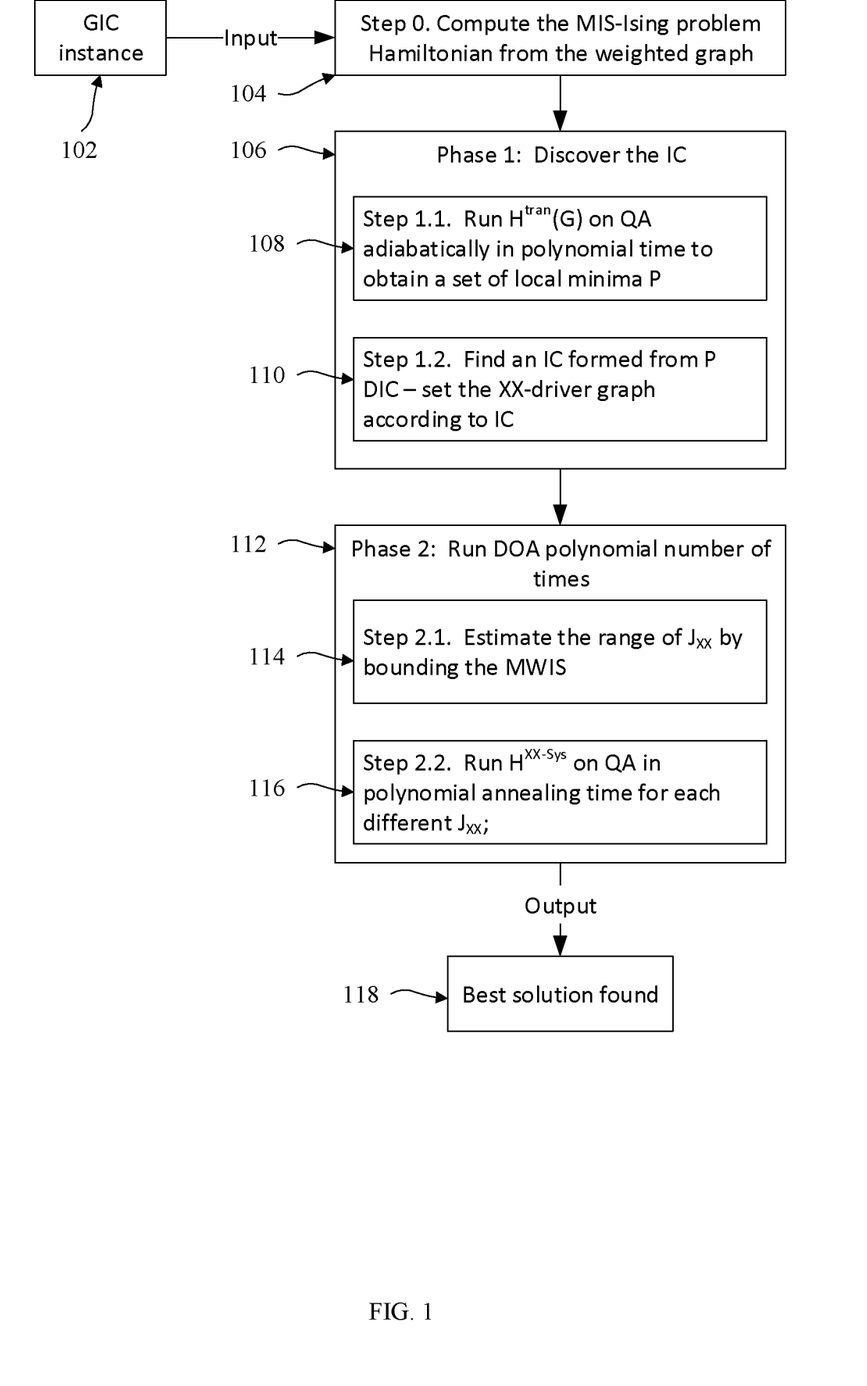
FIG. 1 is a high-level description of a DIC-DAC-DOA algorithm, according to an embodiment.
Figure 6:
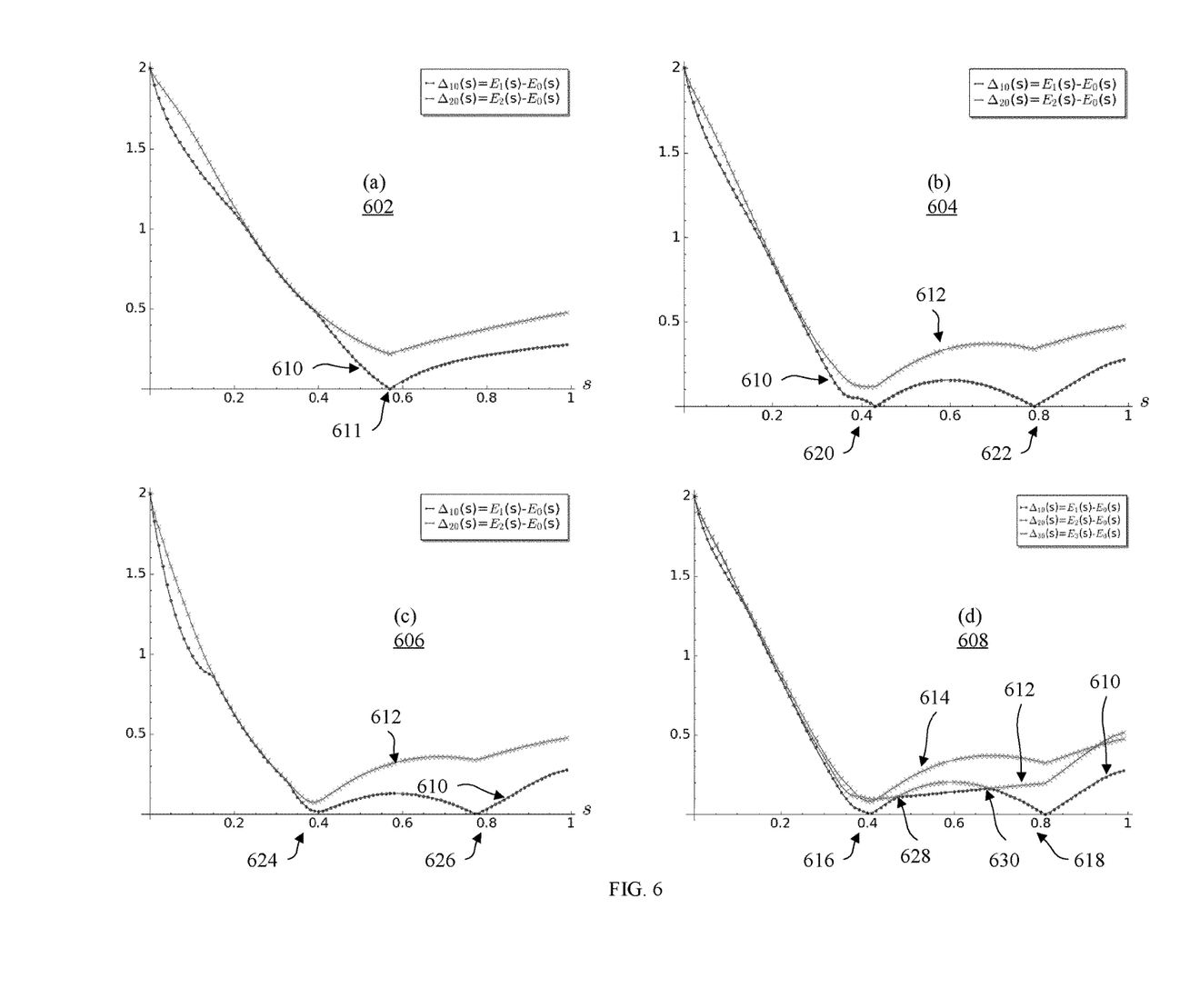
FIG. 6 illustrates the 01-gap spectrum of $\mathcal{H}^{Tran}(G)$, the 01-gap, 02-gap and/or 03-gap spectra of $\mathcal{H}^{XX-Sys}(J_{XX}, G_{driver}, G)$ for different $G_{driver}$, according to an embodiment.

Phase 1 106 discovers the IC structure (if presented) in the graph which may be done using two steps. Such an IC would cause the stoquastic QA e.g., specified by $\mathcal{H}^{Tran}(G)$, to have an (L, R)-ANTI-CROSSING as illustrated in an example in FIG. 4(a) 604. There is one local minima 611 of the 01-gap spectrum 610. The minimum gap may be exponentially small, corresponding to the (L, R)-ANTI-CROSSING. If the annealing time is only polynomial, the QA would return a "wrong answer," an element in L. Repeatedly running step 1.1 108 polynomial times would output a subset of local minima P⊆L. This step 108 can also be implemented by a simulated quantum annealing (SQA) or a classical algorithm.

Figure 5:
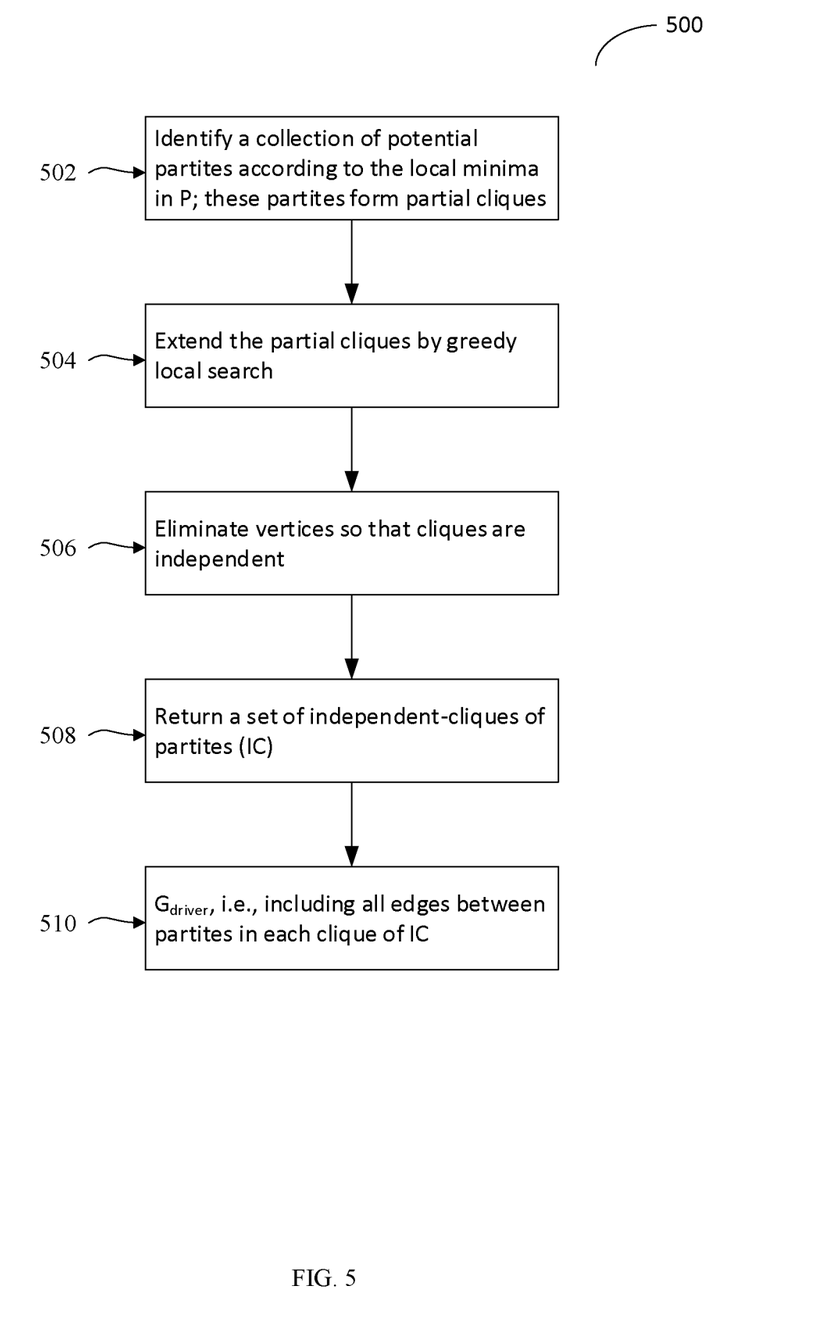
FIG. 5 illustrates a method for computing a set of independent-cliques (IC) and a driver graph, according to an embodiment.

In embodiments, it may be possible to recover G|$_L$ explicitly and L implicitly (as L may consist of exponentially many maximal independent sets), with high probability, by making use of our assumption that L is formed by an IC. The independent-cliques (IC) assumption may be used for the efficacy of identifying G|$_L$ with partial information of L. Step 1.2 110 includes a classical algorithmic process to obtain the IC based on the local minima in P. With reference to FIG. 5, an example process 500 may be used for determining IC and thus the driver graph, which can be performed by a classical processor, such as a classical computer, or a quantum processor, or a combination of them. G|$_{IC}$ may be identified as follows. In step 502, partites (which include single vertices or independent sets) are identified. This can be done by examining each pair of local minima in P. By definition, any two local minima form a bipartite graph, which can consist of several connected components. Each connected component of the bipartite graph consists of two almost equal weight partites. These are the candidate partites. Each partite must be contained entirely in each local minimum in P. For each local minimum in P, the number of partites that are contained in it, and the number of partites violated by it are recorded. The goodness of each local minimum by the difference of the two numbers is measured. All not-good local minima in P may then be eliminated. Denote the resulting set of local minima by P'. The remaining partites are all consistent with the local minima in P'. These partites form partial cliques. Then we greedily extend the partial cliques 504 to include more vertices whose weights are similar to the weight of the partites. That is, we include the similar-weight vertices which are adjacent to the existing partites in the partial clique, and they are independent from other partites. Then we eliminate the vertices in the cliques 506 found that are adjacent to some vertices in another clique to make sure the cliques are independent. This way we obtain a set of independent cliques of partites IC 508 that generates a set of local minima L (containing P'). The XX-driver graph $G_{driver}$ 510 is taken to be G|$_{IC}$, i.e., it contains all the edges within each clique of the IC.

The above procedure can be implemented in polynomial time. If G|$_L$ has a "clear cut boundary" (i.e., no ambiguous vertex which connects two cliques), we have G|$_{IC}$=G|$_L$. However, the IC may not be unambiguous. Many different ICs are possible. Different procedures (e.g., with different vertex-weight allowances; or different vertex selection criteria) may be used to obtain different potential ICs. Also, one can run step 1.1 108 with different annealing times and with different number of iterations to obtain different sets of P to improve the results.

The guiding rules for constructing the XX-driver graph are to include the XX-couplers between local minima in L (so to cause the split) and avoid including XX-couplers that are coupling states in R and its low-energy neighbouring states. All edges within each clique (i.e., all edges between partites) are taken as XX-couplers to ensure that double-ACs will be formed nested, and also there will be a large spectral gap from the higher level to prevent further transition. Therefore, the XX-driver graph $G_{driver}$ is taken to be G|$_{IC}$, i.e., it contains all the edges within each clique of the IC. We further remark that it is possible to relax the independent-cliques condition to almost-independent-cliques by allowing some edges between these cliques without changing the desired results.

In some embodiment, it is possible to construct a driver graph, e.g., by excluding some edges in each component, and still attain the desired sequence of ACs for DQA-GS to ascend and then descend without the nested double-AC structures, that is, the ACs are no longer correlated but there are the same number of ACs for ascending and descending.

In step 2.1 114, we estimate the range of $J_{XX}$ which would either result in double-ACs or no AC in $\mathcal{H}^{XX\text{-}Sys}(G, J_{XX}, G_{driver})$. For example, we estimate the range of $J_{XX}$ by bounding the MWIS instance (potential values for forming DACs). In order to find an appropriate $J_{xx}$, we obtain an upper bound for the MWIS. Such a good upper bound can be obtained through a weighted clique cover as used in the branch-and-bound algorithm for MWIS. Together with the estimate lower bound by the average energy in L, we obtain a possible range for $J_{XX}$.

In step 2.2 116, we then run polynomial number of different $J_{XX}$ (e.g., evenly) distributed in the range, by annealing $\mathcal{H}^{XX\text{-}Sys}(G, J_{XX}, G_{driver})$ in polynomial time and record the best answer.

In embodiments, for $G_{driver}=G|_{IC}$, for certain $J_{XX}$, there is a double-AC with a large second-level gap. We illustrate this case by an example in FIG. 6(b) 604. There are 2 local minima, 620 and 622, of the 01-gap spectrum 610. They correspond to the two correlated ACs, a double-AC. FIG. 6(b) also illustrated the 02-gap spectrum 612. DQA-GS can be applied here with a polynomial annealing speed (i.e., solve the problem in polynomial time). More precisely, the system diabatically transitions to the first excited state at the first AC 620; then it adiabatically follows the first excited state and does not transition to the second excited state because the gap (in 02-gap spectrum 612) is large; finally, the system returns to the ground state through the second AC 622.

In embodiments, for $G_{driver}=G|_{IC}$, for certain $J_{XX}$, there can be a nested double-AC. With reference to FIG. 6(d) 608, a double-AC (characterized by two local minima 628 and 630 of 12-gap spectrum, which is the difference of 02-gap spectrum 612 and 01-gap spectrum 610) within a double-AC (two local minima 616 and 618). The nested double-AC is well-separated from the third energy level 614. DQA-GS can be successfully applied by diabatically transitioning to the first excited state through the first-AC 616 of the outer double-AC, then diabatically transitioning to the second excited state through the first-AC 628 of the inner double-AC; the system will not transition to third or higher state because the third-level gap 614 is large, but diabatically transition back to the ground state through the two second-ACs 630 and 618 of the nested double-ACs.

The structure of the driver graph can be significant. In some cases, a double-AC fails to form but an AC remains when $G_{driver}=G$, i.e., the driver graph is taken as the same as the problem graph. See an example in FIG. 6(c) 606. There are 2 local minima, 624 and 626, of the 01-gap spectrum 610. However, the first local minimum 624 is no longer an AC, and the gap size is not small. The second local minimum 626 corresponds to an AC. In this case, when we apply DQA-GS, the system might not diabatically transitions to the first excited state at the first local minimum 624 (as the gap size is not small enough), but it will diabatically transition to the first excited state at the second minimum 626 (corresponding to the AC-gap), resulting in staying in the first excited state without transitioning back to the ground state.

In embodiments, for $G_{driver}=G|_{IC}$, for certain $J_{XX}$, there can be no AC (e.g., due to the merging of the two anti-crossings in the double-AC) with a large min-gap. In this case, the system runs in polynomial annealing time adiabatically by remaining in the ground state.

In practice, due to various factors such as the energy values of the local minima, and the AC-gap sizes, the system may not return to the ground state, but stay in the band constituted by the nested double-ACs. In this case, it will return an approximation solution and may still provide a quantum enhancement through DQA.

In embodiment, one AC may be turned into a double-AC or no AC. A system can have multiple ICs forming multiple ACs, and the procedures disclosed herein may be used to construct an appropriate driver graph to resolve all ACs, or one AC at a time.

In embodiments, one may use another NP-complete problem as the model problem because NP-complete problems can be efficiently reduced to each other. For example, one can use MAX-CUT problem instead of MWIS problem, and then transform the driver graph accordingly.

In embodiments, DIC-DAC-DOA can be implemented by other digital or analogue quantum computers which can efficiently simulate quantum annealing hardware with at most polynomial overhead.

Figure 7:
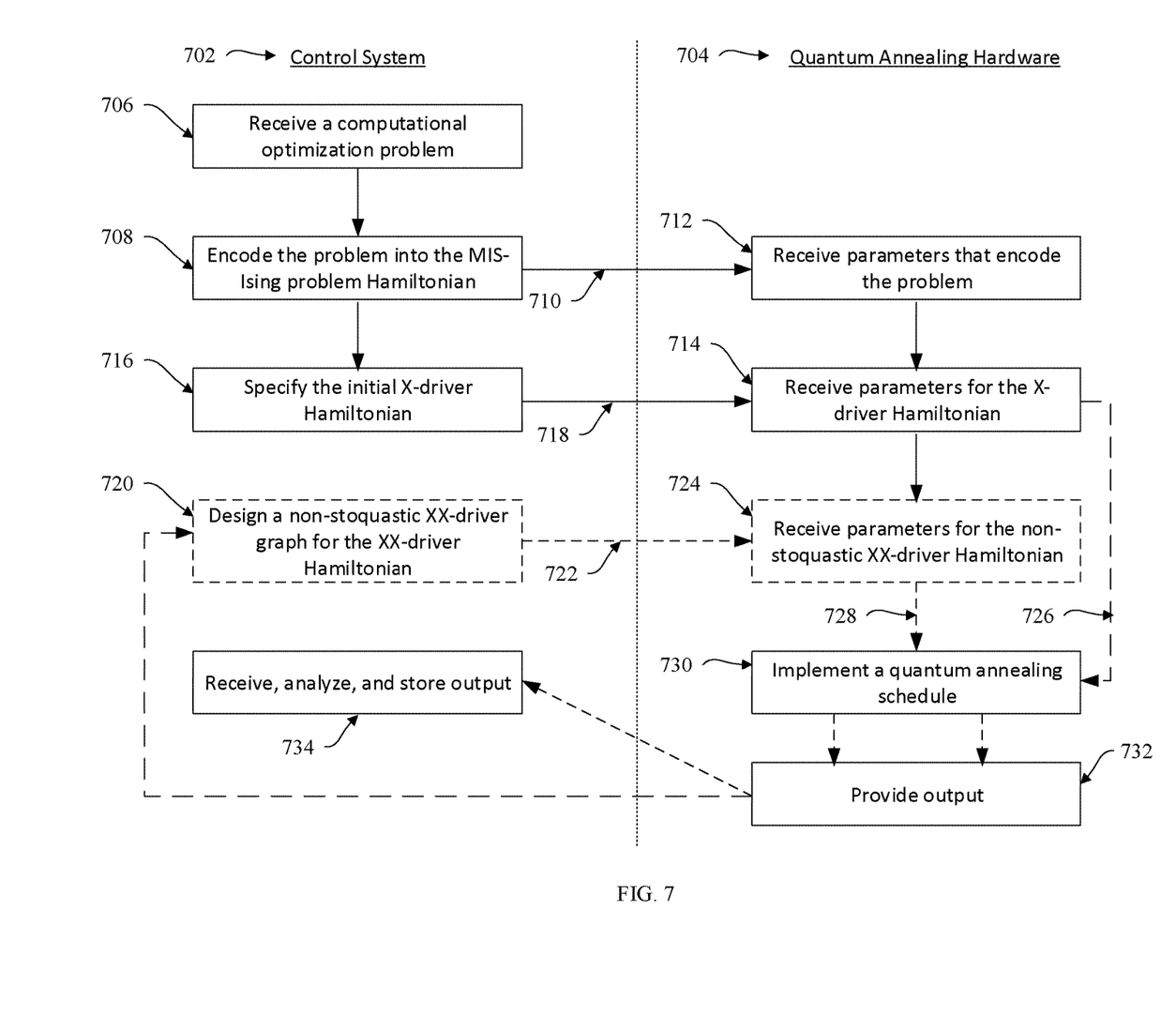
FIG. 7 is a flow diagram of an example process for solving an optimization problem, according to an embodiment.

FIG. 7 shows an embodiment including a process in which a control system 702 programs QA hardware 704, such as a quantum processor, for the QA hardware 704 to solve an optimization problem. The control system 702 includes one or more classical, i.e., non-quantum, computers, and may also include a quantum computer. The task is translated into an optimization problem, which is represented in a machine-readable form.

In embodiments, in step 706, the control system 702 receives a machine readable optimization problem. In step 708, the control system 702 encodes the optimization problem into the equivalent MWIS problem. The control system 702 encodes the MWIS problem into the energy spectrum of an engineered problem Hamiltonian $H_P$. The encoding is based on the structure of the QA hardware 704, such that the problem graph is embeddable in the QA hardware 704. An example of $H_P$ is the MIS-Ising Hamiltonian $\mathcal{H}_{MIS\text{-}Ising}$ and the encoding determines the values for the parameters $h_i$ and $J_{ij}$. The encoded information, such as $h_i$ and $J_i$ is provided 710 to the QA hardware in the form, $P(t)(\Sigma_{i \in V(G)} h_i \sigma_i^z + \Sigma_{ij \in E(G)} J_{ij} \sigma_i^z \sigma_j^z)$. In step 712, the QA hardware 704 receives the information as initialization parameters for the hardware. In step 716, the control system 702 specifies the initial X-driver Hamiltonian. The parameters, in the form of $I(t) \Sigma_{i \in V(G_{driver})} \Delta_i \sigma_i^x$, was sent 718 to the QA hardware 704.

The QA hardware 704 receives the initialization parameters, such as h, and J, and is programmed and initialized by the control system 702 according to the received initialization parameters. In step 730, the QA hardware 704 implements the quantum annealing schedule to obtain eigenstates of the system represented by $\mathcal{H}^{Tran}(G)$. The global and local minima to the MWIS optimization problem is encoded in these eigenstates. After a predetermined amount of time, the QA schedule ends and the QA hardware 704 provides an output 732 represented by the eigenstates and their corresponding energy spectra. The output can be read by the control system 702 or by another classical computer or quantum computer. The predetermined amount of time needs to be exponential in the system size if there is an exponential small anti-crossing gap in order to obtain the global minimum. A shorter, i.e., polynomial time, period of time may be used in the first stage to obtain some local minima. Also, the system can repeat many iterations with different periods of annealing time (total still in polynomial) to improve the results of local minima obtained. The predetermined number of iterations can be 100 iterations or more, or 1000 iterations or more. In some embodiments, the number of iterations can be chosen in connection with the length of the QA schedule (annealing time), so that the process can be performed with high efficiency and provide solutions to the problems with high accuracy.

In step 720, the control system 702 then devises an XX-driver Hamiltonian $\mathcal{H}_{XX}$ based on the output provided above, determined using the process 500 of FIG. 5. The devised XX-driver Hamiltonian $\mathcal{H}_{XX}$ is characterized by control parameters including $J_{XX}$ and $G_{driver}$ which are sent 722 to the QA hardware 704 in the form $D(t)\Sigma_{ij \in (G_{driver})} d_{ij}\sigma_i^x \sigma_j^x$, to program the QA hardware.

The QA hardware receives 724 the set of control parameters for the XX-driver Hamiltonian and is reprogrammed by the control system 702 based on this set of control parameters and the previously determined initialization parameters that encode the problem. The $\mathcal{H}$ combined system is $\mathcal{H}^{XX-Sys}(J_{XX}, G_{driver}, G)$. The QA schedule is implemented again (step 730) and another output is provided (step 732).

The QA schedule is repeated with different $J_{XX}$ within the feasible range, and also repeated with a predetermined number of iterations of QA schedule.

The control system 702 or another data processing system processes all outputs to provide solutions to the problem, and determine if different parameters (including from running the step 1.1 108 again to obtain different driver graphs; or with the same driver graph, but different values of $J_{XX}$, and with different annealing time (QA schedule), and/or repeat a different number of iterations).

Embodiments of digital, i.e., non-quantum, subject matter and digital functional operations described in this specification can be implemented in digital electronic circuitry, in tangibly—embodied computer software or firmware, in computer hardware, including the structures disclosed in this specification and their structural equivalents, or in combinations of one or more of them. Embodiments of the digital subject matter described in this specification can be implemented as one or more computer programs, i.e., one or more modules of computer program instructions encoded on a tangible non transitory storage medium for execution by, or to control the operation of, data processing apparatus. The computer storage medium can be a machine—readable storage device, a machine—readable storage substrate, a random or serial access memory device, or a combination of one or more of them. Alternatively, or in addition, the program instructions can be encoded on an artificially generated propagated signal, e.g., a machine generated electrical, optical, or electromagnetic signal, that is generated to encode information for transmission to suitable receiver apparatus for execution by a data processing apparatus.

The term data processing apparatus refers to digital data processing hardware and encompasses all kinds of apparatus, devices, and machines for processing data, including by way of example a programmable digital processor, a digital computer, or multiple digital processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a standalone program or as a module, component, subroutine, or other unit suitable for use in a digital computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

The processes and logic flows described in this specification can be performed by one or more programmable digital computers, operating with one or more quantum processors, as appropriate, executing one or more computer programs to perform functions by operating on input data and generating output. The processes and logic flows can also be performed by, and apparatus can also be implemented as, special purpose logic circuitry, e.g., an FPGA or an ASIC, or by a combination of special purpose logic circuitry and one or more programmed computers. For a system of one or more digital computers to be configured to perform particular operations or actions means that the system has installed on it, software, firmware, hardware, or a combination of them that in operation cause the system to perform the operations or actions. For one or more computer programs to be configured to perform particular operations or actions means that the one or more programs include instructions that, when executed by digital data processing apparatus, cause the apparatus to perform the operations or actions.

Digital computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a digital computer will also include, or be operatively coupled to receive data from or transfer data to, or both, one or more mass storage devices for storing data, e.g., magnetic, magneto optical disks, or optical disks. However, a computer need not have such devices.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

Control of the various systems described in this specification, or portions of them, can be implemented in a computer program product that includes instructions that are stored on one or more non-transitory machine-readable storage media, and that are executable on one or more digital processing devices. The systems described in this specification, or portions of them, can each be implemented as an apparatus, method, or electronic system that may include one or more digital processing devices and memory to store executable instructions to perform the operations described in this specification.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be under-stood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer implemented method comprising:
    receiving, by a control system, an optimization problem expressed as a Maximum Weighted Independent Set (MWIS) on a problem graph;
    encoding, by the control system, the MWIS problem into an energy spectrum of a problem Hamiltonian;
    determining, by the control system, an XX-driver graph based on an identified independent-cliques (IC), edges in the XX-driver graph being the edges between partites in each clique of the IC, the edges in the XX-driver graph corresponding to XX-couplers of a quantum annealing hardware;
    determining, by the control system, XX-coupler strengths associated with the XX-driver graph;
    specifying, by the control system, a non-stoquastic driver Hamiltonian based on the XX-driver graph and the associated XX-coupler strengths;
    initializing and programming, by the control system, a time-dependent non-stoquastic system Hamiltonian of the quantum annealing hardware using determined values of parameters included in the problem Hamiltonian and determined values of parameters included in the non-stoquastic driver Hamiltonian;
    implementing, by the programmed quantum annealing hardware, a quantum annealing schedule;
    receiving, by the control system and from the quantum annealing hardware, an output representing eigenstates of the system Hamiltonian and corresponding energy values, wherein the eigenstates and the corresponding energy values include a solution to the optimization problem.

2. The method of claim 1, wherein the system Hamiltonian of the quantum annealing hardware comprises a plurality of qubits, ZZ-couplings between the qubits, and XX-couplings between the qubits.

3. The method of claim 1, wherein the problem Hamiltonian is defined on the problem graph wherein each vertex of the problem graph corresponds to a qubit, and each edge of the graph corresponds to a ZZ-coupler between two qubits, and a qubit bias and a coupler strength take real value.

4. The method of claim 1, wherein the non-stoquastic driver Hamiltonian is defined on the XX-driver graph wherein each vertex corresponds to a qubit, and each edge corresponds to an XX-coupler between two qubits and a coupler strength takes real values.

5. The method of claim 1, further comprising:
    initializing the quantum annealing hardware to be in accordance with a ground state of the non-stoquastic driver Hamiltonian; and
    letting the quantum annealing hardware evolve adiabatically at least the initial portion of the evolution such that the time-dependent system Hamiltonian remains in its instantaneous ground state.

6. The method of claim 1, wherein the quantum annealing hardware, represented by the time-dependent non-stoquastic system Hamiltonian for some non-stoquastic driver Hamiltonian with certain XX-coupling strengths, includes a double anti-crossing (AC), the double anti-crossing being two correlated anti-crossings.

7. The method of claim 6, wherein the quantum annealing hardware, diabatically transitions to its instantaneous first excited state at the first AC, then adiabatically follows its instantaneous first excited state, and finally returns to its instantaneous ground state through the second AC.

8. The method of claim 1, wherein the quantum annealing hardware, represented by the time-dependent non-stoquastic system Hamiltonian for some non-stoquastic driver Hamiltonian with certain XX-coupling strengths, includes at least one nested double anti-crossings (ACs), each nested double-AC being a double-AC within another double-AC.

9. The method of claim 8, wherein the quantum annealing hardware transitions to each of its instantaneous higher excited state successively through a cascade of first ACs, the number of ACs equating the number of k excited states, adiabatically following the instantaneous $k^{th}$ excited state and transitioning back to its instantaneous ground state through a cascade of second ACs.

10. The method of claim 1, wherein the quantum annealing hardware, represented by the time-dependent non-stoquastic system Hamiltonian for some non-stoquastic driver Hamiltonian with certain XX-coupling strengths, includes no anti-crossing (AC).

11. The method of claim 10, wherein the quantum annealing hardware evolves adiabatically and remains in its instantaneous ground state until the quantum annealing hardware reaches the ground state of its final Hamiltonian.

12. A control system for programming quantum annealing hardware, the control system comprising:
    one or more computers, each of the one or more computers including a processor and a computer-readable media having instructions stored therein which, when executed by the processors, cause the one or more computers to perform any of the methods of claims 1 to 11.

* * * * *